United States Patent
Subramanian et al.

(10) Patent No.: US 10,129,052 B2
(45) Date of Patent: Nov. 13, 2018

(54) PHASE NOISE ESTIMATION

(71) Applicant: QUALCOMM Incorporated, San Diego, CA (US)

(72) Inventors: Sundar Subramanian, Bridgewater, NJ (US); Muhammad Nazmul Islam, Edison, NJ (US); Juergen Cezanne, Ocean Township, NJ (US); Junyi Li, Chester, NJ (US); Krishna Kiran Mukkavilli, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 2 days.

(21) Appl. No.: 15/000,657

(22) Filed: Jan. 19, 2016

(65) Prior Publication Data
US 2017/0048086 A1 Feb. 16, 2017

Related U.S. Application Data

(60) Provisional application No. 62/205,231, filed on Aug. 14, 2015.

(51) Int. Cl.
H03K 9/00 (2006.01)
H04L 25/02 (2006.01)
H04L 5/00 (2006.01)
H04B 1/10 (2006.01)
(Continued)

(52) U.S. Cl.
CPC ....... *H04L 25/0236* (2013.01); *H04B 1/1027* (2013.01); *H04L 5/006* (2013.01);
(Continued)

(58) Field of Classification Search
CPC .................. H04L 25/0236; H04L 5/0048

USPC .......................................... 375/316
See application file for complete search history.

(56) References Cited

U.S. PATENT DOCUMENTS 8,289,931 B2   10/2012 Higuchi et al.
8,428,042 B1   4/2013 Chion et al.
(Continued)

FOREIGN PATENT DOCUMENTS

WO   WO-2013147764 A1   10/2013
WO   WO-2014154294 A1   10/2014

OTHER PUBLICATIONS

ISA/EP, International Search Report and Written Opinion of the International Searching Authority, Int'l Application No. PCT/US2016/041775, dated Nov. 8, 2016, European Patent Office, Rijswijk; NL, 10 pgs.

*Primary Examiner* — Helene Tayong
(74) *Attorney, Agent, or Firm* — Holland & Hart LLP

(57) ABSTRACT

Methods, systems, devices, and apparatuses are described for phase noise estimation. A transmitting device identifies a phase noise metric associated with a receiving device. The phase noise metric provides an indication of the expected phase noise for the receiving device. The transmitting device selects a plurality of pilot tones adjacent to each other and a plurality of null tones for a transmission to the receiving device based on the phase noise metric. The plurality of null tones may be adjacent to and on both sides of the pilot tones in the frequency domain. The transmitting device identifies its own phase noise metric and select the pilot tones adjacent to each other and plurality of null tones in further consideration of its own phase noise metric. The receiving device may use the pilot tones and plurality of adjacent null tones to determine a phase noise estimation for the transmission.

30 Claims, 10 Drawing Sheets

(51) Int. Cl.
   *H04L 27/00* (2006.01)
   *H04L 27/26* (2006.01)
   *H04L 27/36* (2006.01)
(52) U.S. Cl.
   CPC ........ *H04L 5/0048* (2013.01); *H04L 25/0224* (2013.01); *H04L 25/0226* (2013.01); *H04L 27/0014* (2013.01); *H04L 27/2646* (2013.01); *H04L 27/2662* (2013.01); *H04L 27/2694* (2013.01); *H04L 27/366* (2013.01); *H04L 27/2675* (2013.01); *H04L 2027/002* (2013.01); *H04L 2027/003* (2013.01)

(56) References Cited

U.S. PATENT DOCUMENTS

| | | |
|---|---|---|
| 8,902,773 B2 | 12/2014 | Anderson et al. |
| 9,019,930 B2 | 4/2015 | Proctor |
| 9,030,992 B2* | 5/2015 | Kuchi .................... H04B 7/024 370/328 |
| 2002/0159533 A1* | 10/2002 | Crawford ............ H04L 27/2657 375/260 |
| 2003/0185314 A1 | 10/2003 | Kolze |
| 2007/0230324 A1* | 10/2007 | Li ......................... H04L 1/0026 370/204 |
| 2009/0019169 A1* | 1/2009 | Li ......................... H04L 5/0007 709/228 |
| 2009/0268837 A1 | 10/2009 | Kimura et al. |
| 2013/0223562 A1 | 8/2013 | Giannakis et al. |
| 2014/0023155 A1* | 1/2014 | Khoryaev ............... H04L 25/08 375/260 |
| 2015/0245339 A1 | 8/2015 | Verma et al. |
| 2015/0280945 A1* | 10/2015 | Tan ..................... H04L 27/2615 375/267 |
| 2016/0057754 A1* | 2/2016 | Azizi ..................... H04W 28/20 370/329 |

* cited by examiner

| 405 | 410 | | | | | | | |
|---|---|---|---|---|---|---|---|---|
| P | | D | N | N | P | D | D | D | P |
| N | | D | D | P | N | D | D | D | N |
| N | | N | D | N | N | D | N | D | N |
| N | | N | D | N | N | D | N | D | N |
| P | | P | D | N | N | D | P | N | P |
| P | | P | D | D | N | D | P | N | P |
| P | | P | N | D | D | N | P | P | P |
| N | | N | N | N | D | N | N | P | N |
| N | | N | P | N | N | P | N | P | N |
| N | | D | P | P | N | P | D | N | N |
| CE | | D | N | P | N | N | D | N | D |
| N | | D | N | N | N | N | D | D | N |
| N | | D | D | N | P | D | D | D | N |
| N | | N | D | D | P | D | N | D | N |
| P | | N | D | D | P | D | N | D | P |
| P | | P | D | D | N | D | P | D | P |
| P | | P | N | D | N | D | P | N | P |
| N | | P | N | N | N | D | P | N | N |
| N | | N | P | N | N | D | N | N | N |
| N | | N | N | N | D | D | N | N | N |
| CE | | D | N | P | D | D | D | D | D |

PHASE NOISE ESTIMATION

CROSS REFERENCES

The present Application for Patent claims priority to U.S. Provisional Patent Application No. 62/205,231 by Subramanian et al., entitled "Phase Noise Estimation," filed Aug. 14, 2015, assigned to the assignee hereof, and expressly incorporated by reference herein.

BACKGROUND

Field of the Disclosure

The present disclosure, for example, relates to wireless communication systems, and more particularly to estimation of phase noise.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station).

Wireless communication systems may suffer from phase noise, which can be more pronounced in systems operating in higher frequencies, e.g., operating in the millimeter wave (mmW) frequency ranges, e.g., 28 GHz, 40 GHz, 60 GHz, etc. This may be due to a higher frequency ratio between a local oscillator and other oscillators. On the UE side, the UEs are typically made with lower quality parts (e.g., oscillators), which also contribute to phase noise generation. This phase noise can create non-negligible variations in phase over the duration of a single symbol, e.g., symbols may be shorter in higher frequency systems.

SUMMARY

The described features generally relate to one or more improved methods, systems, or devices that provide for phase noise estimation for high frequency wireless communication systems, e.g., millimeter wave (mmW) frequency ranges. Generally, the improved methods include a transmitting device sending a selection of pilot tones adjacent to each other, surrounded by null tones to a receiving device, the number of null tones depending upon a phase noise metric associated with the receiving device. The transmitting device may identify the metric for the receiving device based on the device identification, the device category, etc. This may provide an indication of an expected phase noise level the receiving device might experience. The transmitting device may also identify a phase noise metric for itself, e.g., an amount of phase noise the transmitting device is expected to generate and contribute to transmissions. The transmitting devices phase noise metric may also be used to select the pilot tones and surrounding null tones. The transmitting device sends the pilot/adjacent null tones during a control portion of the transmission, during a data symbol portion of the transmission, etc. The pilot/adjacent null tones are sent often enough and in the proper place, dependent upon the receiving and/or transmitting device(s) phase noise metric, to provide for frequent phase noise estimation. The receiving device identifies the phase noise by detecting interference (e.g., signal strength levels) in the null tones, e.g., the farthest null tones will include interference for high phase noise levels. The receiving device compensates for the phase noise for improved control and data symbol decoding and reception.

In a first set of illustrative examples, a method for wireless communication is described. The method may include: identifying a phase noise metric associated with a receiving device; and selecting a plurality of pilot tones adjacent to each other, and a plurality of null tones for a transmission to receiving device based at least in part on the identified phase noise metric, the plurality of null tones being adjacent to and on both sides of the pilot tones in the frequency domain.

In some aspects, the method may include transmitting the pilot tones and the plurality of adjacent null tones during a data symbol transmission. The pilot tones and the plurality of adjacent null tones provide a signal for use in determining a phase noise associated with the data symbols. The method may include adjusting, in the frequency domain, a location of the pilot tones and at least a portion of the plurality of adjacent null tones. The method may include: determining a category associated with the receiving device; and identifying the phase noise metric based at least in part on the category. The category may include at least one of a machine-type communication (MTC) device, or a machine-to-machine (M2M) device, or a legacy device, or a high throughput (HT) device, or a very high throughput (VHT) device, or a wearable device, or combinations thereof.

In some aspects, the method may include: determining an identifier (ID) field associated with the receiving device; and selecting a number of null tones based at least in part on the ID field. The method may include: determining a modulation and coding scheme (MCS) associated with the receiving device; and selecting a number of null tones based at least in part on the MCS. The method may include: determining an interference level associated with the receiving device; and identifying the phase noise metric based at least in part on the interference level.

In some aspects, the method may include: identifying a phase noise metric for each of a plurality of receiving devices; and transmitting, to each of the plurality of receiving devices, a plurality of pilot tones adjacent to each other, the pilot tones associated with the plurality of adjacent null tones, the plurality of adjacent null tones for each receiving device being selected based at least in part on the phase noise metric associated with the receiving device. The method may include selecting a number of pilot tones and adjacent null tones for each receiving device based on a channel selectivity metric associated with each receiving device. The method may include selecting a location of the pilot tones and adjacent null tones for each receiving device based on a symbol index of a transmission to each receiving device.

In some aspects, the method may include identifying a transmitter phase noise metric associated with a transmitting device that transmits the pilot tones and the plurality of null tones to the receiving device, wherein selecting the pilot tones and the plurality of null tones is further based on the transmitter phase noise metric. The transmitting device may include at least one of a user equipment (UE), or a machine-type-communication (MTC) device, or a machine-to-machine (M2M) device, or combinations thereof. The wireless communication system may include a millimeter wave (mmW) wireless communication system.

In a second set of illustrative examples, an apparatus for wireless communication is described. The apparatus may include: a processor; memory in electronic communication with the processor; and instructions stored in the memory. The instructions being executable by the processor to: identify a phase noise metric associated with a receiving device; and select a plurality of pilot tones adjacent to each other, and a plurality of null tones for transmission to a receiving device based at least in part on the identified phase noise metric, the plurality of null tones being adjacent to and on both sides of the pilot tones in the frequency domain.

In some aspects, the instructions are further executable by the processor to: transmit the plurality of pilot tones adjacent to each other, and the plurality of adjacent null tones during a data symbol transmission. The pilot tones and the plurality of adjacent null tones provide a signal for use in determining a phase noise associated with the data symbols. The instructions are further executable by the processor to: adjust, in the frequency domain, a location of the pilot tones and at least a portion of the plurality of adjacent null tones. The instructions are further executable by the processor to: determine a category associated with the receiving device; and identify the phase noise metric based at least in part on the category. The category may include at least one of a machine-type communication (MTC) device, or a machine-to-machine (M2M) device, or a legacy device, or a high throughput (HT) device, or a very high throughput (VHT) device, or a wearable device, or combinations thereof.

In some aspects, the instructions are further executable by the processor to: determine an identifier (ID) field associated with the receiving device; and select a number of null tones based at least in part on the ID field. The instructions are further executable by the processor to: determine a modulation and coding scheme (MCS) associated with the receiving device; and select a number of null tones based at least in part on the MCS. The instructions are further executable by the processor to: determine an interference level associated with the receiving device; and identify the phase noise metric based at least in part on the interference level.

In some aspects, the instructions are further executable by the processor to: identify a phase noise metric for each of a plurality of receiving devices; and transmit, to the plurality of receiving devices, a plurality of pilot tones adjacent to each other, the pilot tones associated with the plurality of adjacent null tones, the plurality of adjacent null tones for each receiving device being selected based at least in part on the phase noise metric associated with the receiving device. The instructions are further executable by the processor to: select a number of pilot tones and adjacent null tones for each receiving device based on a channel selectivity metric associated with each receiving device. The instructions are further executable by the processor to: select a location of the pilot tones and adjacent null tones for each receiving device based on a symbol index of a transmission to each receiving device.

In some aspects, the instructions are further executable by the processor to: identify a transmitter phase noise metric associated with a transmitting device that transmits the plurality of pilot tones adjacent to each other, and the plurality of null tones to the receiving device, wherein the instructions are further executable by the processor to select the pilot tones and the plurality of null tones further based on the transmitter phase noise metric. The transmitting device may include at least one of a user equipment (UE), or a machine-type-communication (MTC) device, or a machine-to-machine (M2M) device, or combinations thereof. The wireless communication system may include a millimeter wave (mmW) wireless communication system.

In a third set of illustrative examples, an apparatus for wireless communication is described. The apparatus may include: means for identifying a phase noise metric associated with a receiving device; and means for selecting a plurality of pilot tones adjacent to each other, and a plurality of null tones for a transmission to receiving device based at least in part on the identified phase noise metric, the plurality of null tones being adjacent to and on both sides of the pilot tones in the frequency domain.

In some aspects, the apparatus may include means for transmitting the pilot tones adjacent to each other, and the plurality of adjacent null tones during a data symbol transmission. The pilot tones and the plurality of adjacent null tones provide a signal for use in determining a phase noise associated with the data symbols.

In a fourth set of illustrative examples, a non-transitory computer-readable medium storing computer-executable code for wireless communication is described. The code executable by a processor to: identify a phase noise metric associated with a receiving device; and select a plurality of pilot tones adjacent to each other, and a plurality of null tones for a transmission to receiving device based at least in part on the identified phase noise metric, the plurality of null tones being adjacent to and on both sides of the pilot tones in the frequency domain.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 4 shows another example transmission scheme for pilot tones and adjacent null tones for phase noise estimation, in accordance with various aspects of the present disclosure;

DETAILED DESCRIPTION

Figure 1:
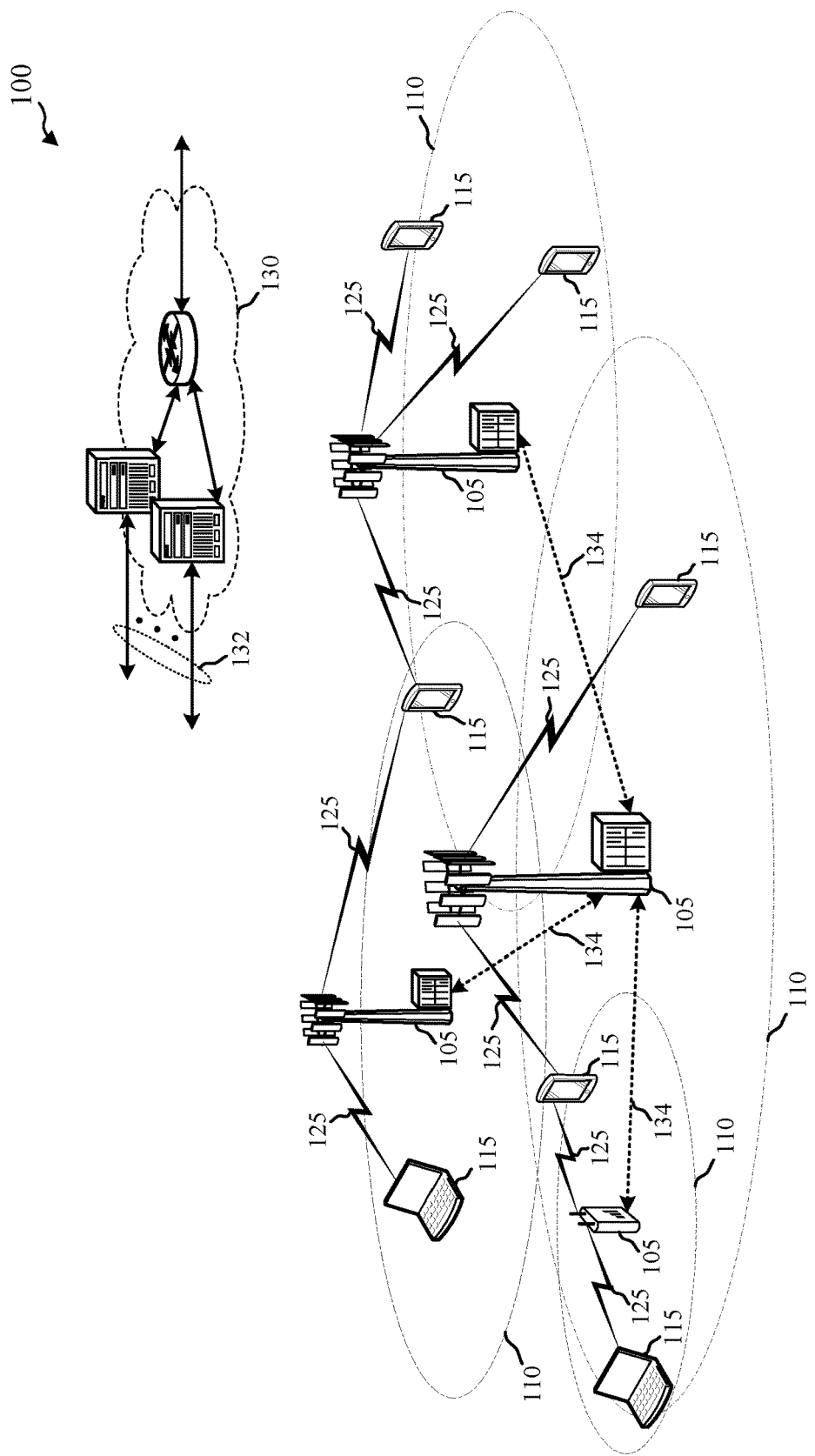
FIG. 1 shows a block diagram of a wireless communication system, in accordance with various aspects of the present disclosure.

Next generation cellular communication systems may utilize millimeter wave (mmW) wireless communication channels. Such mmW communication channels may involve using frequencies in the 20+ GHz range, which requires additional considerations regarding interference and noise. Phase noise, for example, although an issue in conventional cellular communication systems, becomes more pronounced in mmW communication channels due to such characteristics as smaller symbol size, high frequency ratio between oscillators, use of lower quality parts in some devices (e.g., user equipments (UEs)), etc. In some examples, phase noise in a mmW communication channel may cause interference within the period of a single signal. Conventional phase noise estimation and mitigation techniques may not adequately address the phase noise concerns raised by high frequency wireless communication systems.

According to aspects of the present description, in high frequency systems (e.g., mmW communication systems), a transmitting device may identify a phase noise metric for a receiving device. The phase noise metric may provide an indication of the amount or severity of the phase noise problem for the receiving device, e.g., the amount of phase noise the receiving device may be expected to experience. The transmitting device may, based on the phase noise metric, transmit pilot tones adjacent to each other that are surrounded by null tones to the receiving device to provide for phase noise estimation. As the transmitting device may also generate and contribute phase noise to transmissions, it may also identify a transmitter phase noise metric and use this to select the location and/or number of pilot tones and surrounding null tones. The number of null tones may be dependent upon the phase noise metric for the receiving device, e.g., more null tones for receiving devices associated with higher phase noise, and/or the transmitting device. The transmitting device may select the location, the periodicity, the frequency, etc., of the pilot tone/adjacent null tones based on the phase noise metric(s) for the receiving device and/or the transmitting device. The receiving device receives the transmission including the pilot tone/adjacent null tones and uses the null tones to determine its phase noise, e.g., uses the empty null tones around the known pilot tone to capture the phase noise spectrum. In a base station scenario, the base station may transmit pilot tone/adjacent null tones to multiple receiving devices (e.g., UEs), the number of null tones for each receiving device being selected based on the phase noise metric for the respective receiving device.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communications system 100 in accordance with various aspects of the disclosure. The wireless communications system 100 includes base stations 105, UEs 115, and a core network 130. The core network 130 may provide user authentication, access authorization, tracking, Internet Protocol (IP) connectivity, and other access, routing, or mobility functions. The base stations 105 interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro and/or small cell base stations). There may be overlapping geographic coverage areas 110 for different technologies.

In some examples, the wireless communications system 100 is an LTE/LTE-A network. In LTE/LTE-A networks, the term evolved Node B (eNB) may be generally used to describe the base stations 105, while the term UE may be generally used to describe the UEs 115. The wireless communications system 100 may be a Heterogeneous LTE/LTE-A network in which different types of eNBs provide coverage for various geographical regions. For example, each eNB or base station 105 may provide communication coverage for a macro cell, a small cell, and/or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 are dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

The communication links 125 shown in wireless communications system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using FDD (e.g., using paired spectrum resources) or TDD operation (e.g., using unpaired spectrum resources). Frame structures for FDD (e.g., frame structure type 1) and TDD (e.g., frame structure type 2) may be defined.

In some embodiments of the system 100, base stations 105 and/or UEs 115 may include multiple antennas for employing antenna diversity schemes to improve communication quality and reliability between base stations 105 and UEs 115. Additionally or alternatively, base stations 105 and/or UEs 115 may employ multiple-input, multiple-output (MIMO) techniques that may take advantage of multi-path environments to transmit multiple spatial layers carrying the same or different coded data.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

Wireless communications system 100 may operate in an ultra-high frequency (UHF) frequency region using frequency bands from 700 MHz to 2600 MHz (2.6 GHz), although in some cases WLAN networks may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter wave band (or mmW), since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions. EHF transmissions may also be more prone to certain types of interference, such as phase noise interference.

Wireless communications system 100 may support phase noise estimation. For example, a mmW transmitting device may provide a pilot tone that is surrounded by null tones for a receiving device to use for phase noise estimation. The pilot tone/adjacent null tones may be sent frequently enough that phase noise estimation may be performed on a continual or frequent basis by the receiving device. The pilot tone/adjacent null tones may be sent during control information transmissions and during data symbol transmissions. For receiving devices associated with higher phase noise interference, more pilot tone/adjacent null tone transmission may be provided, may be provided more often, and the number of adjacent null tones may be increased. Conversely, for receiving devices associated with lower phase noise interference, fewer pilot tone/adjacent tone transmissions may be provided, may be provided less frequently, and the number of adjacent null tones may be reduced. The transmitting device may consider its own phase noise contributions when sending the pilot tone and adjacent null tones. Thus, aspects of the present disclosure provide adaptive techniques for phase noise estimation that are tailored to the receiving device.

At the receiving device, the receiver may perform channel equalization techniques using channel estimation protocols and utilize the described phase noise estimation techniques to identify and mitigate the impact of phase noise. For example, the receiving device may use the empty tones (null tones) surrounding the known pilot tone to capture a spectrum of the phase noise. The receiving device may utilize this phase noise spectrum to remove the reduce the phase noise for received data symbols.

Figure 2:
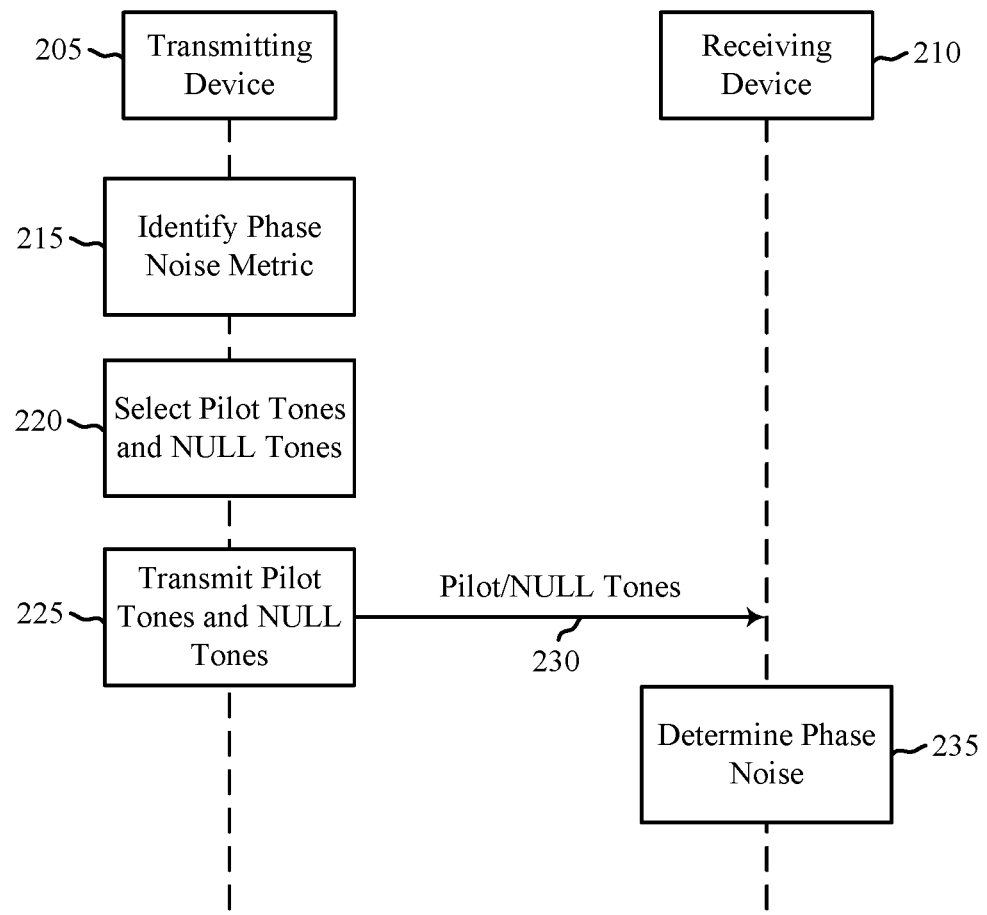
FIG. 2 shows an example of communications between a transmitting device and a receiving device for phase noise estimation, in accordance with various aspects of the present disclosure.

FIG. 2 is a diagram 200 that shows an example of communication between a transmitting device 205 and a receiving device 210, in accordance with various aspects of the present disclosure. The diagram 200 may illustrate aspects of the wireless communications system 100 described with reference to FIG. 1. The diagram 200 includes the transmitting device 205 and the receiving device 210. The transmitting device 205 and/or the receiving device 210 may communicate in a high frequency wireless communications system, such as an EHF or mmW wireless communications system. The transmitting device 205 and/or receiving device may be examples of one or more of the UEs 115 and/or the base stations 105 described above with respect to FIG. 1. In some examples, the transmitting device 205 is an example of a UE 115 or a base station 105 and the receiving device 210 is an example of a UE 115. In some examples, a system device, such as one of the UEs 115 or base stations 105 may execute one or more sets of codes to control the functional elements of the device to perform some or all of the functions described below.

At 215, the transmitting device 205 identifies a phase noise metric associated with the receiving device 210. The phase noise metric may provide an indication of the amount of phase noise expected for the receiving device 210. The phase noise metric may be identified based on an identifier of the receiving device 210, on a category of the receiving device 210, etc. The identifier or category may provide an indication of the type of the receiving device 210, e.g., a legacy device using older equipment/oscillators versus a modern device using newer equipment, a machine-type-communication (MTC) device, a machine-to-machine (M2M) device, etc. The phase noise metric may also be identified based on feedback information received from the receiving device 210, e.g., based on messages received from the receiving device 210 including information indicating the phase noise the receiving device 210 has experienced. The phase noise metric may also be identified based on channel conditions and/or interference level associated with the receiving device 210, e.g., based on reported channel estimation parameters. The phase noise metric may also be identified based on a modulation-and-coding scheme (MCS) being used for transmissions to the receiving device 210. Accordingly, the transmitting device 205 may have at least some indication of the extent of the phase noise associated with the receiving device. In an example where the transmitting device 205 is a base station, identifying the phase noise metric includes identifying a phase noise metric for each associated receiving device.

At 215, the transmitting device 205 may also identify its own phase noise metric, i.e., a phase noise metric associated with the transmitting device 205. The transmitter phase noise metric generally provides an indication of the amount of phase noise the transmitting device 205 generates and contributes to its transmissions. The transmitting device 205 also includes hardware, e.g., oscillators, filters, etc., that generate phase noise that is included in transmissions from the transmitting device 205. The transmitting device 205 may identify its phase noise metric based on known information, e.g., based on current configuration information. The transmitting device 205 may also identify its phase noise metric based on feedback information received from the receiving device 210. In some examples, the transmitting device 205 identifies and considers its own phase noise metric when configured as a user equipment (UE), as a machine-type-communication (MTC) device, as a machine-to-machine (M2M) device, etc. In some examples, the transmitting device 205 identifies and considers its own phase noise metric when configured as a UE participating in device-to-device (D2D) communications with another UE.

At 220, the transmitting device 205 selects, based on the identified phase noise metric(s), a plurality of pilot tones adjacent to each other, and surrounding null tones for the receiving device 210. The number of adjacent (or surrounding) null tones may be increased when the receiving device 210 is associated with greater phase noise (e.g., has a higher associated phase noise metric) or reduced for less phase noise. Based on the identified phase noise metric(s), selecting the pilot tones/adjacent null tones may include selecting or adjusting a frequency of the pilot tones and all or some of the surrounding null tones, adjusting the frequency or periodicity that the pilot tones/adjacent null tones are transmitted to the receiving device 210, etc. In the example where the transmitting device 205 is a base station, selecting includes selecting pilot tones/adjacent null tones for each receiving device based on the receiving device's respective phase noise metric. Moreover, the location and/or number of the pilot tones/adjacent null tones for each receiving device may be selected.

At 225, the transmitting device 205 transmits the pilot tones and surrounding null tones 230 to the receiving device 210. The transmission may be via the mmW wireless communications system.

At 235, the receiving device 210 determines a phase noise estimation based on the received pilot tones and surrounding null tones. For example, the receiving device 210 may use the pilot tone and surrounding null tones to determine a phase noise associated with data symbols transmitted along with the pilot tones/adjacent null tones. The receiving device 210 uses the pilot tones/adjacent null tones to capture the phase noise spectrum or trajectory and remove it for the transmitted data symbols. The receiving device 210 identifies the plurality of pilot tones and null tones transmitted by the transmitting device 205; the identified information may be utilized in selecting a plurality of pilot tones and null tones when the receiving device 210 takes on a transmitting role.

Figure 3:
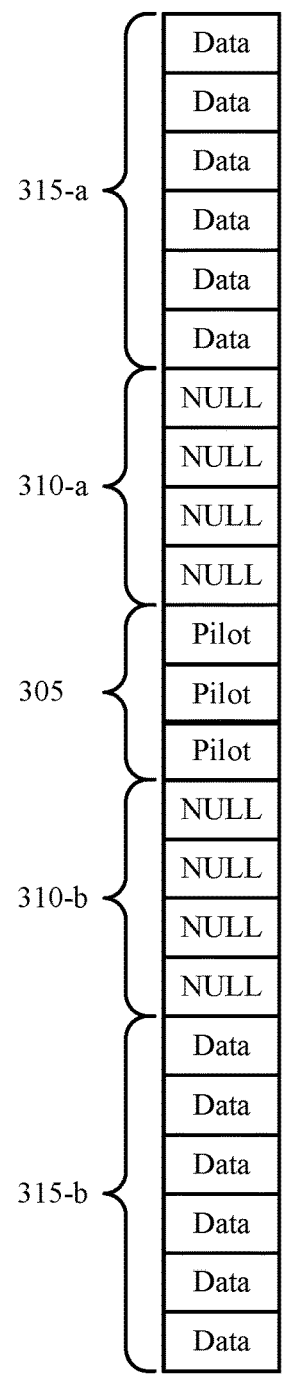
FIG. 3 shows an example transmission scheme for a selection of pilot tones and adjacent null tones for phase noise estimation, in accordance with various aspects of the present disclosure.

FIG. 3 shows an example transmission scheme 300 for pilot tones and adjacent null tones for phase noise estimation, in accordance with various aspects of the present disclosure. The transmission scheme 300 generally provides a phase noise compensation pilot structure that can be used according to the described techniques. The transmission scheme 300 may implement aspects of the wireless communications system 100 described with reference to FIG. 1. The transmission scheme 300 may implement aspects of the example communications between the transmitting device 205 and the receiving device 210 described with reference to FIG. 2. Aspect of the transmission scheme 300 may be implemented by the UEs 115, base stations 105, transmitting device 205, and/or receiving device 210 described with reference to FIGS. 1 and 2.

The transmission scheme 300 includes pilot tones 305 (three tones in total) in a symbol surrounded by a plurality of null tones 310 (eight tones in total, four above and four below). The pilot tones 305 and null tones 310 are surrounded by data tones 315, e.g., transmitted in a portion of the transmission associated with data symbol 315 transmission. Each symbol may be associated with a channel, sub-carrier, channel, etc., for the wireless communications system. Although transmission scheme 300 shows four null tones 310-a above and four null tones 310-b below the pilot tones 305, it is to be understood that the number of null tones 310 is selected based on the phase noise metric for the receiving device and/or the transmitting device, as described above. The pilot tones 305 may include a fixed or known signal strength provided for reference purposes and easily detected by the receiving device. The null tones 310 are generally blank or empty tones where no signal is transmitted. Therefore, the null tones 310 may be used by the receiving device to detect phase noise, e.g., by measuring signals (noise) in the symbols where the null tones 310 are transmitted.

In some aspects, the number and location of null tones 310 may be selected to ensure there is sufficient blank symbols available for phase noise detection. For example, the number of null tones 310 may be selected to account for phase noise introduced by the pilot tone as well as phase noise introduced by the surrounding data symbol 315 transmissions.

In some aspects, the pilot tones 305 are used to estimate phase noise in the data symbols 315, e.g., as described above. Channel adaptation techniques may be provided for each channel, e.g., derived from demodulation reference signal (DMRS) symbols.

A receiving device may receive the transmission scheme 300 and use the pilot tones/adjacent null tones scheme for phase noise estimation. In one non-limiting example, the receiving device may apply a mask to the symbols associated with the pilot tones 305 and plurality of null tones 310 to determine the phase noise. The symbol X(f) may be used where f is 1 for the first tone, 2 for the second tone, etc. The receiving device may use the function $Z(f)=X(f)*H*(f)$, where H is selected based on a previous phase noise estimation, an expected phase noise estimation, etc. The receiving device may apply a mask of "1" to the symbols associated with the pilot tones 305 and null tones 310 and remove from a first phase noise $(f)=Z(f-f0)*Mask(f-f0)$ where the Mask is "1" where the group of pilot tones 305 and null tones 310 are present. The receiving device may perform an inverse fast Fourier transform (IFFT) function to determine the phase noise estimation. The receiving device may perform the IFFT function on several phase noise estimations to provide the phase noise estimations, e.g., phase noise estimations based on an average, on a trend associated with the phase noise, etc.

FIG. 4 shows another example transmission scheme 400 for pilot tones and adjacent null tones for phase noise estimation, in accordance with various aspects of the present disclosure. The transmission scheme 400 generally provides a phase noise compensation pilot structure that can be used according to the described techniques. The transmission scheme 400 may implement aspects of the wireless communications system 100 described with reference to FIG. 1. The transmission scheme 400 may implement aspects of the example communications between the transmitting device 205 and the receiving device 210 described with reference to FIG. 2. Aspect of the transmission scheme 400 may be implemented by the UEs 115, base stations 105, transmitting device 205, and/or receiving device 210 described with reference to FIGS. 1 and 2.

The transmission scheme 400 generally includes a control portion 405 of the transmission and a data symbol portion 410 of the transmission. The described pilot tones ("P") and surrounding null tones ("N") are included in the control portion 405 and in the data symbol portion 410. In the control portion 405, the pilot tones and surrounding null tones are transmitted along with various control information, such as channel estimation ("CE") symbols that may be used by the receiving device for channel adaptation functions. The pilot tones and surrounding null tones provide for phase noise estimation to improve reception of the control information in the control portion 405 as well as the data symbols ("D") in the data symbol portion 410 of the transmission.

In some aspects, the number of null tones for a given selection of pilot tones may be based on the phase noise metric associated with the intended receive device. As shown in the transmission scheme 400, the pilot tones may include one null tone above and below, two null tones above and below, three null tones above and below, and so on. Thus, a receiving device having a higher phase noise metric (e.g., associated with higher phase noise) may be provided sufficient null tones to estimate its phase noise, but may not be allocated unnecessary null tones (e.g., may use those symbols for data transmission. In some examples, the number of null tones for a given selection of pilot tones may also be based on the phase noise metric associated with the transmitting device.

In some aspects, the location (or frequency) of the pilot tones and surrounding null tones may be selected based on the receiving device phase noise metric. For example, the transmitting device may vary or adjust the location (e.g., from one symbol or sub-carrier) over different transmission time periods. Other examples of adjusting the location may include selecting pilot tones and surrounding null tones in the higher order channels based on the associated channel frequency. The location of the pilot tones/adjacent null tones may hop across various time functions and/or frequency locations of the transmission scheme 400. In some examples, the location (or frequency) of the pilot tones and surrounding null tones may be selected based on the phase noise metric associated with the transmitting device.

In the example where the transmitting device is a base station, the transmission scheme 400 may be used to provide different pilot tones and adjacent null tone transmission schemes for each receiver. For example, the configuration of pilot tones/adjacent null tones shown in the transmission scheme 400 may be associated with multiple receiving devices (e.g., each receive device is scheduled to receive certain symbols). The base station may select the location, periodicity, etc., for pilot tone(s) and the number of adjacent null tones for a given receiver based on its phase noise metric. Thus, the transmission scheme 400 may include some pilot tones/adjacent null tones for a first receiver and other pilot tones/adjacent null tones for a second receiver. In some examples, multiple transmitting devices (e.g., base stations) may use the same transmission scheme for pilot tone/adjacent null tone transmission to a given receive device.

Figure 5:
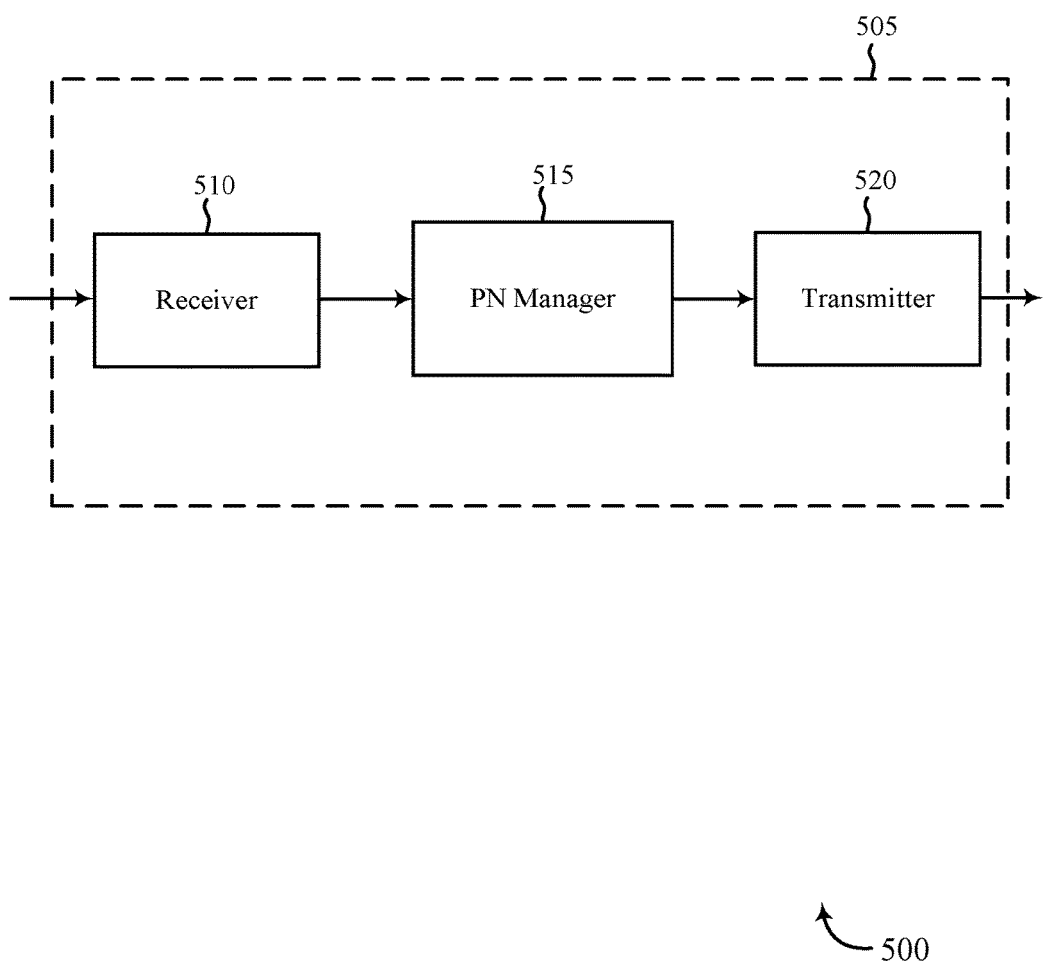
FIG. 5 shows a block diagram of a device configured for use in wireless communication, in accordance with various aspects of the present disclosure.

FIG. 5 shows a block diagram 500 of a device 505 for use in wireless communication, in accordance with various aspects of the present disclosure. The device 505 may be an example of one or more aspects of a UE 115 or a base station 105 described with reference to FIG. 1. The device 505 may be an example of aspects of a transmitting device 205 and/or a receiving device 210 described with reference to FIG. 2. The device 505 may implement aspects of the transmission schemes described with reference to FIGS. 3 and 4. The device 505 may be configured as a transmitting device or as a receiving device. The device 505 may include a receiver 510, a phase noise (PN) manager 515, and/or a transmitter 520. The device 505 may also be or include a processor (not shown). Each of these components may be in communication with each other.

The components of the device 505 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each component may also be implemented, in whole or in part, with instructions embodied in a memory, formatted to be executed by one or more general or application-specific processors.

The receiver 510 may receive information such as packets, user data, and/or control information associated with various information channels (e.g., control channels, data channels, etc.). The receiver 510 may be configured to receive transmissions including pilot tones adjacent to each other, and surrounding (or adjacent) null tones to be used for phase noise estimation. Information may be passed on to the phase noise manager 515, and to other components of the device 505.

The phase noise manager 515 may monitor, control, or otherwise manage aspects of phase noise estimation for the device 505. As one example where the device 505 is configured as a transmitting device, the phase noise manager 515 may identify the phase noise metric associated with a receiving device. The phase noise metric may be identified based on known information about the receiving device, e.g., the device identification/category, that is received from the receiving device. The phase noise metric may be identified based on the channel selectivity associated with the receiving device, based on the MCS, interference level, etc., associated with the receiving device. The phase noise manager 515 may select a plurality of pilot tones adjacent to each other, and a plurality of adjacent null tones for a transmission to the receiving device based on the phase noise metric. The plurality of null tones may be adjacent to and on both sides of the pilot tones in the frequency domain.

As another example where the device 505 is configured as a receiving device, the phase noise manager 515 may receive a transmission from the transmitting device that comprises a plurality of pilot tones adjacent to each other, and a plurality of null tones. The plurality of null tones may be adjacent to and on both sides of the pilot tones in the frequency domain. The phase noise manager 515 may identify or determine a phase noise for the receiving device based on the received pilot tones and plurality of null tones. The receiving device may utilize the phase noise information in selecting a plurality of pilot tones adjacent to each other, and a plurality of null tones, when the receiving device takes on a transmitting role.

The transmitter 520 may transmit the one or more signals received from other components of the device 505. The transmitter 520 may transmit transmissions including pilot tone and surrounding null tones for phase noise estimation. In some examples, the transmitter 520 may be collocated with the receiver 510 in a transceiver component.

Figure 6:
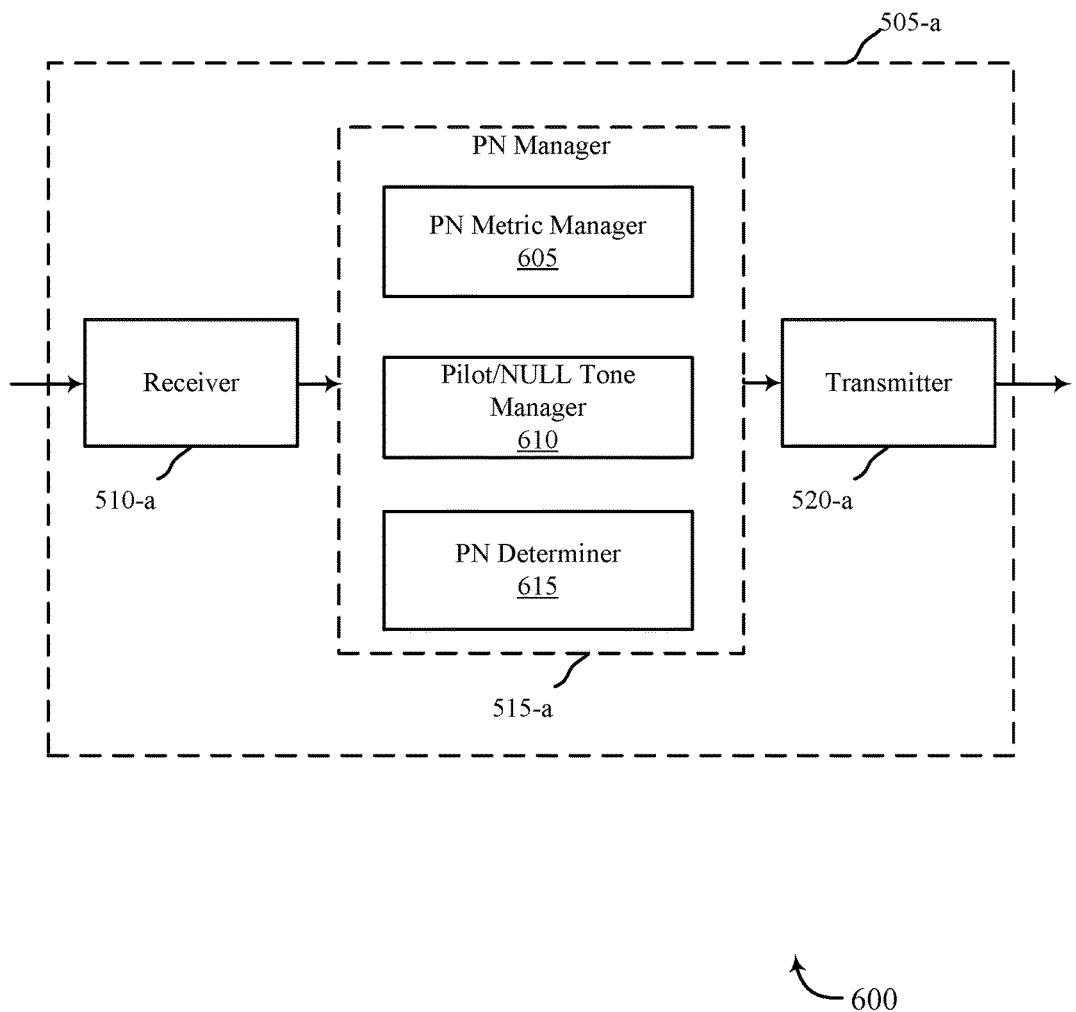
FIG. 6 shows a block diagram of a device configured for use in wireless communication, in accordance with various aspects of the present disclosure.

FIG. 6 shows a block diagram 600 of a device 505-a for use in wireless communication, in accordance with various examples. The device 505-a may be an example of one or more aspects of a UE 115 or a base station 105 described with reference to FIG. 1. The device 505-a may be an example of a transmitting device 205 and/or a receiving device 210 described with reference to FIG. 2. The device 505-a may implement aspects of the frame structures described with reference to FIGS. 3 and 4. The device 505-a may also be an example of a device 505 described with reference to FIG. 5. The device 505-a may include a receiver 510-a, a phase noise (PN) manager 515-a, and/or a transmitter 520-a, which may be examples of the corresponding components of device 505. The device 505-a may also include a processor (not shown). Each of these components may be in communication with each other. The phase noise manager 515-a may include a phase noise metric manager 605, a pilot/null tone manager 610, and/or a phase noise determiner 615. The receiver 510-a and the transmitter 520-a may perform the functions of the receiver 510 and the transmitter 520, of FIG. 5, respectively.

The phase noise metric manager 605 may monitor, control, or otherwise manage aspects of phase noise metric identification for the device 505-a. For example when the device 505 is configured as a transmitting device, the phase noise metric manager 605 may identify a phase noise metric associated with a receiving device. The phase noise metric generally provides an indication of the amount of phase noise the receiving device is likely to experience.

In some aspects, the receiving device may be associated with a particular category and the phase noise metric may be based on the category of the receiving device. Example categories include, but are not limited to, a MTC device, or a M2M device, or a legacy device, or a high throughput (HT) device, or a very high throughput (VHT) device, or a wearable device, and the like. The phase noise metric may be based on an identifier associated with the receiving device. The phase noise metric may be based on a MCS associated with the receiving device. The phase noise metric may be based on an interference level associated with the receiving device. The phase noise metric may be identified by receiving information from the receiving device, e.g., an identifier or category indication, based on measured or reported channel conditions, e.g., MCS selection or interference reporting, etc.

The phase noise metric manager 605 may identify a transmitter phase noise metric associated with the device 505. The transmitter phase noise metric may provide an indication of the amount or severity of the phase noise the device 505-*a* generates and contributes to its transmissions.

In some aspects where the transmitting device is a base station, the phase noise metric manager 605 may identify a phase noise metric for each of the associated receiving devices. The receiving devices may be associated with different MCS selections, interference levels, categories, etc. Thus, each receiving device may have its own associated phase noise metric.

In an example where the device 505-*a* is configured as a receiving device, the phase noise metric manager 605 may provide a signal to the transmitting device indicative of its associated phase noise metric, e.g., an identifier field, a category indication, etc.

The pilot/null tone manager 610 may monitor, control, or otherwise manage aspects of pilot/null tone selection and utilization for the device 505-*a*. For example and when the device 505-*a* is configured as a transmitting device, the pilot/null tone manager 610 may select a plurality of pilot tones adjacent to each other, and a plurality of null tones for a transmission to the receiving device based on the phase noise metric associated with the receiving device. The plurality of null tones may be adjacent to and on both sides of the pilot tones in the frequency domain. The pilot/null tone manager 610 may select the plurality of pilot tones adjacent to each other, and the plurality of null tones also based on a transmitter phase noise metric.

In some aspects, the pilot/null tone manager 610 may adjust, in the frequency domain, a location of the pilot tones and at least a portion of the plurality of null tones. The pilot/null tone manager 610 may select the number of null tones based at least in part on the identifier of the receiving device and/or based on the MCS selected for the associated receiving device.

In the example where the transmitting device is a base station, the pilot/null tone manager 610 may select a plurality of pilot tones adjacent to each other, and plurality of null tones based on the phase noise metric associated with each receiving device. The pilot/null tone manager 610 may select the number of pilot tones and adjacent null tones for each receiving device based on a channel selectivity metric associated with each receiving device. The pilot/null tone manager 610 may select a location of the pilot tones and adjacent null tones for each receiving device based on a symbol index of a transmission to each receiving device.

In the example where the device 505-*a* is configured as a receiving device, the pilot/null tone manager 610 may identify the location of the pilot tones and adjacent null tones. The pilot/null tone manager 610 may identify the location in the frequency domain, in the time domain, etc., for the pilot tones and adjacent null tones. The pilot/null tone manager 610 may identify a periodicity of transmission of the pilot tones and plurality of adjacent tones.

The phase noise determiner 615 may monitor, control, or otherwise manage aspects of phase noise estimation for the device 505-*a*. For example when the device 505-*a* is configured as a transmitting device, the phase noise determiner 615 may transmit the pilot tones adjacent to each other, and plurality of adjacent null tones to the receiving device. The phase noise determiner 615 may transmit the pilot tones and adjacent null tones in a data symbol portion of the transmission, in a control information portion of the transmission, or in both portions of the transmission.

In the example where the transmitting device is a base station, the phase noise determiner 615 may transmit the plurality of pilot tones adjacent to each other, and plurality of null tones to each of the receiving devices and at the location, time, frequency, etc., for the respective receive device.

In the example where the device 505-*a* is configured as a receiving device, the phase noise determiner 615 may use the transmitted pilot tones and plurality of adjacent null tones to identify or determine a phase noise estimation for the device 505-*a*.

Figure 7:
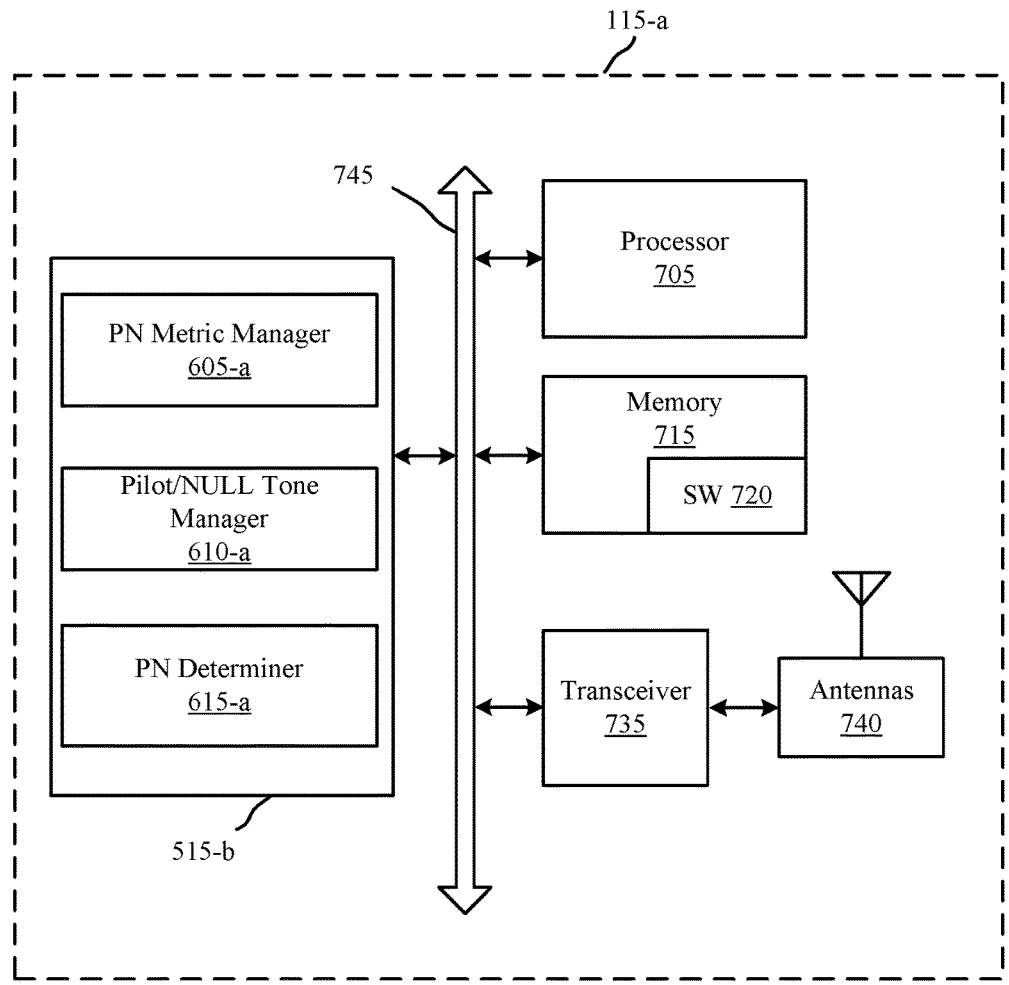
FIG. 7 shows a block diagram of a user equipment (UE) for use in wireless communication, in accordance with various aspects of the present disclosure.

FIG. 7 shows a system 700 for use in wireless communication, in accordance with various examples. System 700 may include a UE 115-*a*, which may be an example of the UEs 115 of FIG. 1, an example of aspects of a transmitting device 205 or receiving device 210 of FIG. 2, and/or an example of aspects of devices 505 of FIGS. 5 and 6. The UE 115-*a* may implement aspects of the transmission schemes described with reference to FIGS. 3 and 4. Generally, the UE 115-*a* may be configured as a transmitting device and/or a receiving device supporting phase noise estimation in accordance with the described techniques.

The UE 115-*a* may generally include components for bi-directional voice and data communications including components for transmitting communications and components for receiving communications. The UE 115-*a* may include antenna(s) 740, a transceiver 735, a processor 705, and memory 715 (including software (SW) 720), which each may communicate, directly or indirectly, with each other (e.g., via one or more buses 745). The transceiver 735 may be configured to communicate bi-directionally, via the antenna(s) 740 and/or one or more wired or wireless links, with one or more networks, as described above. For example, the transceiver 735 may be configured to communicate bi-directionally with base stations 105 with reference to FIG. 1. The transceiver 735 may include a modem configured to modulate the packets and provide the modulated packets to the antenna(s) 740 for transmission, and to demodulate packets received from the antenna(s) 740. While the UE 115-*a* may include a single antenna 740, the UE 115-*a* may have multiple antennas 740 capable of concurrently transmitting and/or receiving multiple wireless transmissions. The transceiver 735 may be capable of concurrently communicating with one or more base stations 105 via multiple component carriers.

The UE 115-*a* may include a phase noise manager 515-*b*, which may perform the functions described above for the phase noise manager 515 of device 505 of FIGS. 5 and 6. For example, the phase noise manager 515-*b* may include a phase noise metric manager 605-*a*, a pilot/null tone manager 610-*a*, a phase noise determiner 615-*b*, which may be examples and perform the functions of the phase noise metric manager 605, pilot/null tone manager 610, and phase noise determiner 615, respectively, of FIG. 6.

The memory 715 may include random access memory (RAM) and read-only memory (ROM). The memory 715 may store computer-readable, computer-executable software/firmware code 720 containing instructions that are configured to, when executed, cause the processor 705 to perform various functions described herein (e.g., identify phase noise metric for a receiving device and select a plurality of pilot tones adjacent to each other, and plurality of adjacent null tones based on the phase noise metric, etc.). Alternatively, the computer-readable, computer-executable software/firmware code 720 may not be directly executable by the processor 705 but be configured to cause a computer (e.g., when compiled and executed) to perform functions described herein. The processor 705 may include an intelligent hardware device, e.g., a central processing unit (CPU), a microcontroller, an application-specific integrated circuit (ASIC), etc.

Figure 8:
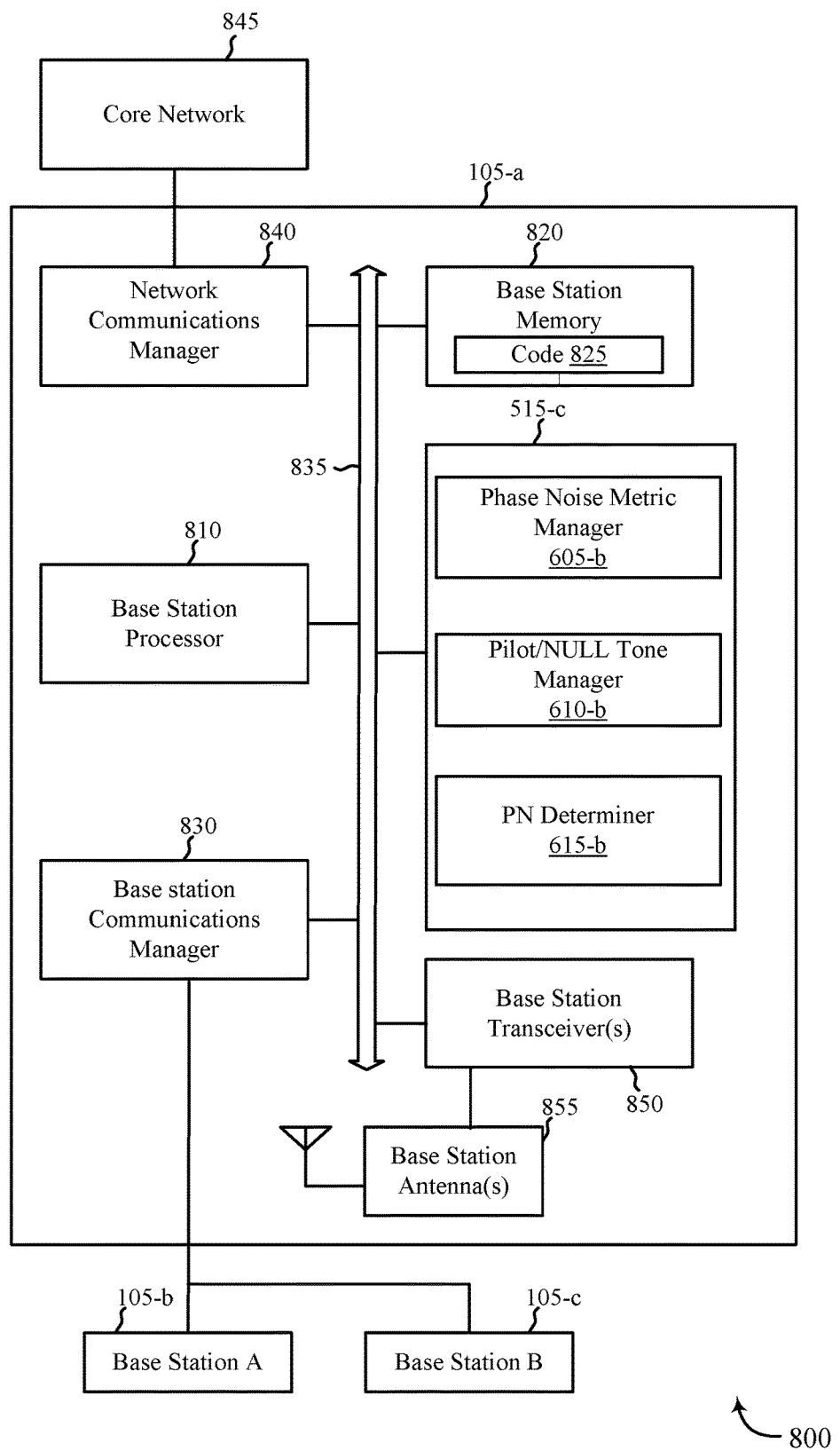
FIG. 8 shows a block diagram of a base station (e.g., a base station forming part or all of an eNB) for use in wireless communication, in accordance with various aspects of the present disclosure.

FIG. 8 shows a block diagram 800 of a base station 105-*a* (e.g., a base station forming part or all of an eNB) for use in wireless communication, in accordance with various aspects of the present disclosure. In some examples, the base station 105-*a* may be an example of aspects of one or more of the base stations 105 described with reference to FIG. 1, and/or aspects of one or more of the transmitting devices 205, when configured as a base station, as described with reference to FIGS. 2-4. The base station 105-*a* may be configured to implement or facilitate at least some of the base station and/or apparatus features and functions described with reference to FIGS. 2-4.

The base station 105-*a* may include a base station processor 810, a base station memory 820, at least one base station transceiver (represented by base station transceiver 850), at least one base station antenna (represented by base station antenna(s) 855), and/or a phase noise manager 515-*c*, which may be an example and perform the functions of the phase noise manager 515 of FIGS. 5 and 6. The base station 105-*a* may also include one or more of a base station communications manager 830 and/or a network communications manager 840. Each of these components may be in communication with each other, directly or indirectly, over one or more buses 835.

The base station memory 820 may include random access memory (RAM) and/or read-only memory (ROM). The base station memory 820 may store computer-readable, computer-executable software/firmware code 825 containing instructions that are configured to, when executed, cause the base station processor 810 to perform various functions described herein related to wireless communication (e.g., pilot and null tone transmission for phase noise estimation, etc.). Alternatively, the computer-readable, computer-executable software/firmware code 825 may not be directly executable by the base station processor 810 but be configured to cause the base station 105-*a* (e.g., when compiled and executed) to perform various of the functions described herein.

The base station processor 810 may include an intelligent hardware device, e.g., a central processing unit (CPU), a microcontroller, an ASIC, etc. The base station processor 810 may process information received through the base station transceiver 850, the base station communications manager 830, and/or the network communications manager 840. The base station processor 810 may also process information to be sent to the transceiver 850 for transmission through the antenna(s) 855, to the base station communications manager 830, for transmission to one or more other base stations 105-*b* and 105-*c*, and/or to the network communications manager 840 for transmission to a core network 845, which may be an example of one or more aspects of the core network 130 described with reference to FIG. 1. The base station processor 810 may handle, alone or in connection with the phase noise manager 515-*c*, various aspects of pilot tone and null tone transmission to receiving devices for phase noise estimation.

The base station transceiver 850 may include a modem configured to modulate packets and provide the modulated packets to the base station antenna(s) 855 for transmission, and to demodulate packets received from the base station antenna(s) 855. The base station transceiver 850 may, in some examples, be implemented as one or more base station transmitter components and one or more separate base station receiver components. The base station transceiver 850 may support communications in a first radio frequency spectrum band and/or a second radio frequency spectrum band. The base station transceiver 850 may be configured to communicate bi-directionally, via the antenna(s) 855, with one or more UEs or apparatuses, such as one or more of the UEs 115 described with reference to FIGS. 1, 3, 4, and 7. The base station 105-*a* may, for example, include multiple base station antennas 855 (e.g., an antenna array). The base station 105-*a* may communicate with the core network 845 through the network communications manager 840. The base station 105-*a* may also communicate with other base stations, such as the base stations 105-*b* and 105-*c*, using the base station communications manager 830.

The phase noise manager 515-*c* may be configured to perform and/or control some or all of the features and/or functions described with reference to FIGS. 2-4 related to phase noise estimation. In some examples, the phase noise manager 515-*c* may include a phase noise metric manager 605-*b*, a pilot/null tone manager 610-*b*, and a phase noise determiner 615-*b*, which may be examples and perform the functions of the phase noise metric manager 605, the pilot/null tone manager 610, and the phase noise determiner 615, respectively, of FIG. 6. The phase noise manager 515-*c*, or portions of the phase noise manager 515-*c*, may include a processor, and/or some or all of the functions of the phase noise manager 515-*c* may be performed by the base station processor 810 and/or in connection with the base station processor 810.

Figure 9:
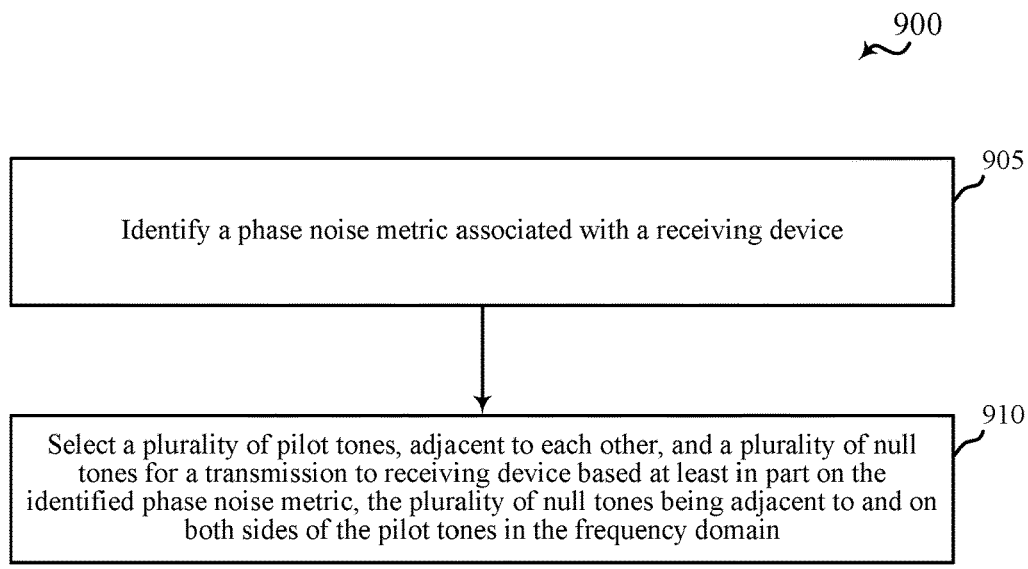
FIG. 9 is a flow chart illustrating an example of a method for wireless communication, in accordance with various aspects of the present disclosure.

FIG. 9 is a flow chart illustrating an example of a method 900 for wireless communication, in accordance with various aspects of the present disclosure. For clarity, the method 900 is described below with reference to aspects of one or more of the transmitting devices described with reference to FIGS. 2-4, and/or aspects of one or more of the devices 505 described with reference to FIGS. 5 and 6. In some examples, a UE and/or a base station may execute one or more sets of codes to control the functional elements of the UE or base station to perform the functions described below. Additionally or alternatively, the UE or base station may perform one or more of the functions described below using special-purpose hardware.

At block 905, the method 900 may include the transmitting device identifying a phase noise metric associated with a receiving device. The operation(s) at block 905 may be performed using the phase noise manager 515 described with reference to FIGS. 5-8.

At block 910, the method 900 may include the transmitting device selecting a plurality of pilot tones adjacent to each other, and a plurality of null tones for a transmission to the receiving device based at least in part on the identified phase noise metric, the plurality of null tones being adjacent to and on both sides of the pilot tones in the frequency domain. The operation(s) at block 910 may be performed using the phase noise manager 515 described with reference to FIGS. 5-8.

Figure 10:
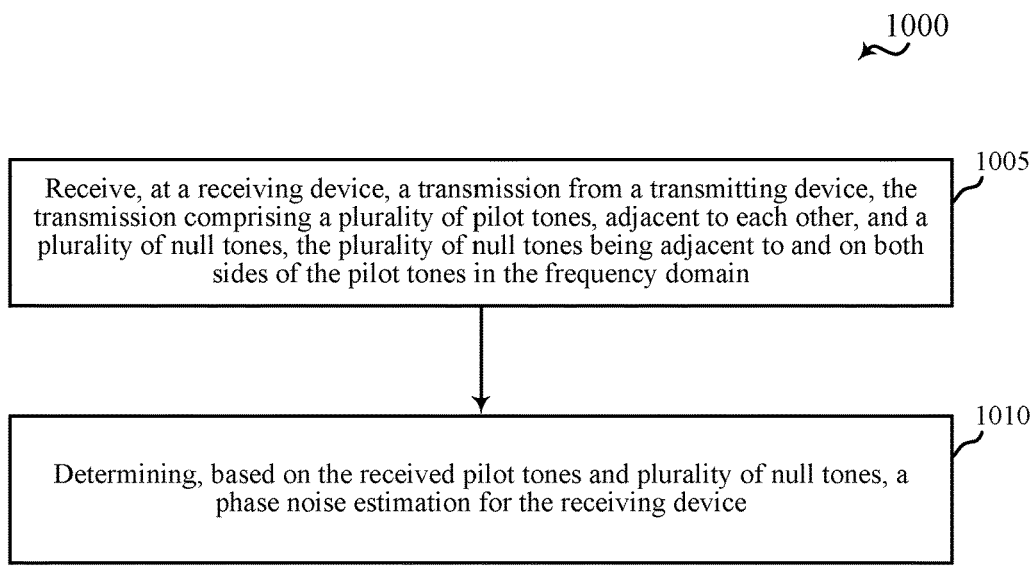
FIG. 10 is a flow chart illustrating an example of a method for wireless communication, in accordance with various aspects of the present disclosure.

FIG. 10 is a flow chart illustrating an example of a method 1000 for wireless communication, in accordance with various aspects of the present disclosure. For clarity, the method 1000 is described below with reference to aspects of one or more of the receiving devices described with reference to FIGS. 2-4, and/or aspects of one or more of the devices 505 described with reference to FIGS. 5 and 6. In some examples, a UE may execute one or more sets of codes to control the functional elements of the UE to perform the functions described below. Additionally or alternatively, the UE may perform one or more of the functions described below using special-purpose hardware.

At block 1005, the method 1000 may include the receiving device receiving a transmission from the transmitting device, the transmission comprising a plurality of pilot tones adjacent to each other, and a plurality of null tones, the plurality of null tones being adjacent to and on both sides of the pilot tones in the frequency domain. The operation(s) at block 1005 may be performed using the phase noise manager 515 described with reference to FIGS. 5-8.

At block 1010, the method 1000 may include the receiving device determining, based on the received pilot tones and plurality of null tones, a phase noise estimation for the receiving device. The operation(s) at block 1010 may be performed using the phase noise manager 515 described with reference to FIGS. 5-8.

Figure 11:
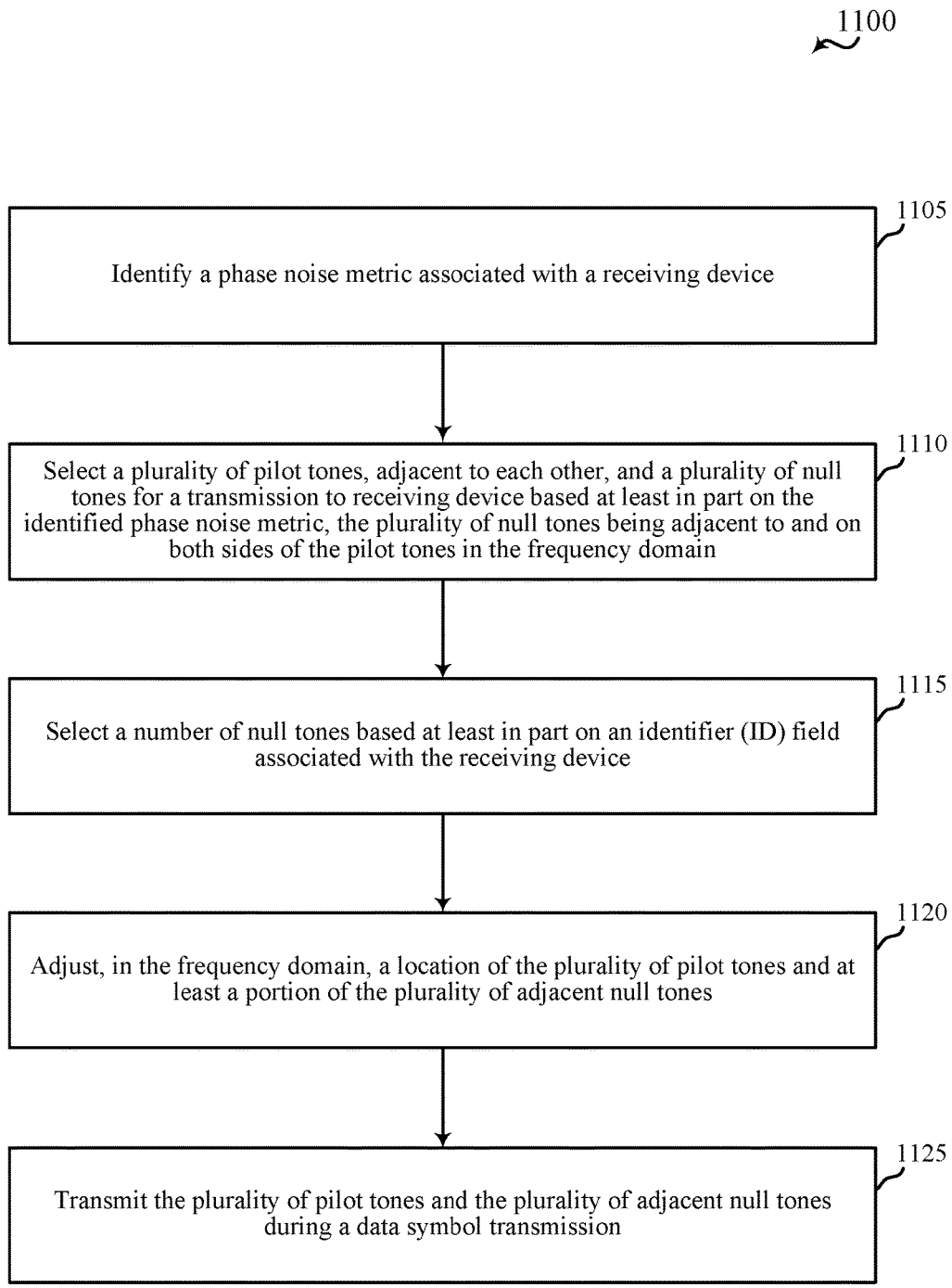
FIG. 11 is a flow chart illustrating an example of a method for wireless communication, in accordance with various aspects of the present disclosure.

FIG. 11 is a flow chart illustrating an example of a method 1100 for wireless communication, in accordance with various aspects of the present disclosure. For clarity, the method 1100 is described below with reference to aspects of one or more of the transmitting devices described with reference to FIGS. 2-4, and/or aspects of one or more of the devices 505 described with reference to FIGS. 5 and 6. In some examples, a UE and/or a base station may execute one or more sets of codes to control the functional elements of the UE or base station to perform the functions described below. Additionally or alternatively, the UE or base station may perform one or more of the functions described below using special-purpose hardware.

At block 1105, the method 1100 may include the transmitting device identifying a phase noise metric associated with a receiving device. At block 1110, the method 1000 may include the transmitting device selecting a plurality of pilot tones adjacent to each other, and a plurality of null tones for a transmission to the receiving device based at least in part on the identified phase noise metric, the plurality of null tones being adjacent to and on both sides of the pilot tones in the frequency domain. At block 1115, the method 1100 may include the transmitting device selecting a number of null tones based at least in part on an identifier (ID) field associated with the receiving device.

At block 1120, the method 1100 may include the transmitting device adjusting, in the frequency domain, a location of the pilot tones and at least a portion of the plurality of adjacent null tones. At block 1125, the method 1100 may include the transmitting device transmitting the pilot tones and the plurality of adjacent null tones during a data transmission.

The operation(s) at blocks 1105, 1110, 1115, 1120, and 1125 may be performed using the phase noise manager 515 described with reference to FIGS. 5-8.

Thus, the methods 900-1100 may provide for wireless communication. It should be noted that the methods 900-1100 are just example implementations and that the operations of the methods 900-1100 may be rearranged or otherwise modified such that other implementations are possible.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (WiFi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:
   identifying, at a first device, a phase noise metric associated with a receiving device;
   identifying, at the first device, a transmitter phase noise metric associated with the first device based at least in part on a component configuration of the first device; and
   selecting, at the first device, a plurality of pilot tones adjacent to each other, and a plurality of null tones for a transmission to the receiving device based at least in part on the identified phase noise metric and the identified transmitter phase noise metric, the plurality of null tones being adjacent to and on both sides of the pilot tones in the frequency domain.

2. The method of claim 1, further comprising:
   transmitting, from the first device, the plurality of pilot tones and the plurality of adjacent null tones during a data symbol transmission.

3. The method of claim 2, wherein the plurality of pilot tones adjacent to each other, and the plurality of adjacent null tones provide a signal for use in determining a phase noise associated with the data symbols.

4. The method of claim 1, further comprising:
   adjusting, in the frequency domain, a location of the plurality of pilot tones adjacent to each other and at least a portion of the plurality of adjacent null tones.

5. The method of claim 1, further comprising:
   determining a category associated with the receiving device; and
   identifying the phase noise metric based at least in part on the category.

6. The method of claim 5, wherein the category comprises at least one of a machine-type communication (MTC) device, or a machine-to-machine (M2M) device, or a legacy device, or a high throughput (HT) device, or a very high throughput (VHT) device, or a wearable device, or combinations thereof.

7. The method of claim 1, further comprising:
   determining an identifier (ID) field associated with the receiving device; and
   selecting a number of null tones based at least in part on the ID field.

8. The method of claim 1, further comprising:
   determining a modulation and coding scheme (MCS) associated with the receiving device; and
   selecting a number of null tones based at least in part on the MCS.

9. The method of claim 1, further comprising:
   determining an interference level associated with the receiving device; and
   identifying the phase noise metric based at least in part on the interference level.

10. The method of claim 1, further comprising:
    identifying a phase noise metric for each of a plurality of receiving devices; and
    transmitting, to each of the plurality of receiving devices, a plurality of pilot tones adjacent to each other, the plurality of pilot tones associated with the plurality of adjacent null tones, the plurality of adjacent null tones for each receiving device being selected based at least in part on the phase noise metric associated with the receiving device.

11. The method of claim 10, further comprising:
    selecting a number of pilot tones adjacent to each other, and adjacent null tones for each receiving device based at least in part on a channel selectivity metric associated with each receiving device.

12. The method of claim 10, further comprising:
    selecting a location of the plurality of pilot tones adjacent to each other, and adjacent null tones for each receiving device based at least in part on a symbol index of a transmission to each receiving device.

13. The method of claim 1, wherein
the receiving device identifies the plurality of pilot tones and null tones transmitted by a transmitting device;
the identified information utilized in selecting a plurality of pilot tones and null tones when the receiving device takes on a transmitting role.

14. The method of claim 1, wherein the first device comprises at least one of a user equipment (UE), or a machine-type-communication (MTC) device, or a machine-to-machine (M2M) device, or combinations thereof.

15. The method of claim 1, wherein the wireless communication system is a millimeter wave (mmW) wireless communication system.

16. The method of claim 1, wherein selecting the plurality of pilot tones and the plurality of null tones for the transmission to the receiving device is based at least in part on a channel selectivity metric.

17. An apparatus for wireless communication, comprising:
a processor;
memory in electronic communication with the processor; and
instructions stored in the memory, the instructions being executable by the processor to:
identify, at a first device, a phase noise metric associated with a receiving device;
identify, at the first device, a transmitter phase noise metric associated with the first device based at least in part on a component configuration of the first device; and
select, at the first device, a plurality of pilot tones adjacent to each other, and a plurality of null tones for a transmission to the receiving device based at least in part on the identified phase noise metric and the identified transmitter phase noise metric, the plurality of null tones being adjacent to and on both sides of the pilot tones in the frequency domain.

18. The apparatus of claim 17, wherein the instructions are further executable by the processor to:
transmit, from the first device, the plurality of pilot tones adjacent to each other, and the plurality of adjacent null tones during a data symbol transmission.

19. The apparatus of claim 18, wherein the plurality of pilot tones adjacent to each other, and the plurality of adjacent null tones provide a signal for use in determining a phase noise associated with the data symbols.

20. The apparatus of claim 17, wherein the instructions are further executable by the processor to:
adjust, in the frequency domain, a location of the plurality of pilot tones and at least a portion of the plurality of adjacent null tones.

21. The apparatus of claim 17, wherein the instructions are further executable by the processor to:
determine a category associated with the receiving device; and
identify the phase noise metric based at least in part on the category.

22. The apparatus of claim 21, wherein the category comprises at least one of a machine-type communication (MTC) device, or a machine-to-machine (M2M) device, or a legacy device, or a high throughput (HT) device, or a very high throughput (VHT) device, or a wearable device, or combinations thereof.

23. The apparatus of claim 17, wherein the instructions are further executable by the processor to:
determine an identifier (ID) field associated with the receiving device; and
select a number of null tones based at least in part on the ID field.

24. The apparatus of claim 17, wherein the instructions are further executable by the processor to:
determine a modulation and coding scheme (MCS) associated with the receiving device; and
select a number of null tones based at least in part on the MCS.

25. The apparatus of claim 17, wherein the instructions are further executable by the processor to:
determine an interference level associated with the receiving device; and
identify the phase noise metric based at least in part on the interference level.

26. The apparatus of claim 17, wherein the instructions are further executable by the processor to:
identify a phase noise metric for each of a plurality of receiving devices; and
transmit, to each of the plurality of receiving devices, a plurality of pilot tones adjacent to each other, the plurality of pilot tones associated with the plurality of adjacent null tones, the plurality of adjacent null tones for each receiving device being selected based at least in part on the phase noise metric associated with the receiving device.

27. The apparatus of claim 26, wherein the instructions are further executable by the processor to:
select a number of pilot tones adjacent to each other, and adjacent null tones for each receiving device based at least in part on a channel selectivity metric associated with each receiving device.

28. An apparatus for wireless communication, comprising:
means for identifying, at a first device, a phase noise metric associated with a receiving device;
means for identifying, at the first device, a transmitter phase noise metric associated with the first device based at least in part on a component configuration of the first device; and
means for selecting, at the first device, a plurality of pilot tones adjacent to each other, and a plurality of null tones for a transmission to the receiving device based at least in part on the identified phase noise metric and the identified transmitter phase noise metric, the plurality of null tones being adjacent to and on both sides of the pilot tones in the frequency domain.

29. The apparatus of claim 28, further comprising:
means for transmitting, from the first device, the plurality of pilot tones adjacent to each other and the plurality of adjacent null tones during a data symbol transmission.

30. A non-transitory computer-readable medium storing computer-executable code for wireless communication, the code comprising instructions executable by a processor to:
identify, at a first device, a phase noise metric associated with a receiving device;
identify, at the first device, a transmitter phase noise metric associated with the first device based at least in part on a component configuration of the first device; and
select, at the first device, a plurality of pilot tones adjacent to each other and a plurality of null tones for a transmission to the receiving device based at least in part on the identified phase noise metric and the identified transmitter phase noise metric, the plurality of null tones being adjacent to and on both sides of the pilot tones in the frequency domain.

* * * * *